(12) United States Patent
Chow et al.

(10) Patent No.: US 6,717,620 B1
(45) Date of Patent: Apr. 6, 2004

(54) METHOD AND APPARATUS FOR DECOMPRESSING COMPRESSED DATA

(75) Inventors: Paul Chow, Richmond Hill (CA); Allen J. Porter, Thornhill (CA); David A. Strasser, Toronto (CA); Antonio Asaro, Scarboro (CA); Indra Laksono, Richmond Hill (CA); Biljana D. Simsic, Toronto (CA)

(73) Assignee: ATI Technologies, Inc., Ontario (CA)

( * ) Notice: Subject to any disclaimer, the term of this patent is extended or adjusted under 35 U.S.C. 154(b) by 841 days.

(21) Appl. No.: 09/096,550

(22) Filed: Jun. 12, 1998

(51) Int. Cl.[7] ............................. H04N 11/04; H04B 1/66
(52) U.S. Cl. .............................. 348/384.1; 375/240.16; 375/240.25
(58) Field of Search ................................. 348/405, 416, 348/384, 437, 419, 455, 445, 423, 420, 699, 467; 380/49

(56) References Cited

U.S. PATENT DOCUMENTS

| | | | | |
|---|---|---|---|---|
| 5,412,484 A | * | 5/1995 | Yoshikawa | 348/405 |
| 5,420,866 A | * | 5/1995 | Wasilewski | 348/474 |
| 5,579,052 A | * | 11/1996 | Artieri | 348/416 |
| 5,623,423 A | * | 4/1997 | Lipovski | 708/203 |
| 5,764,773 A | * | 6/1998 | Nishiura | 380/49 |
| 5,812,760 A | * | 9/1998 | Mendenhall et al. | 348/467 |
| 5,828,425 A | * | 10/1998 | Kim | 348/423 |

OTHER PUBLICATIONS

International Standard, ISO/IEC 13818–2, first edition pp. 63, Annex A, May 15, 1996.*

* cited by examiner

*Primary Examiner*—Gims Philippe
(74) *Attorney, Agent, or Firm*—Vedder, Price, Kaufman & Kammholz, P.C.

(57) ABSTRACT

A method and apparatus for decompressing compressed data, which includes video data that has been compressed in accordance with the MPEG 2 standard, wherein the processing begins by retrieving components from a non-local memory at a rate that is independent of the rate in which the components were written into the non-local memory. The components include motion vectors and run/level data. As the components are retrieved from memory, the run/level data is used to produce representations of the uncompressed data. As the representations of the uncompressed data are generated, they are processed based on the motion vector data to recapture the uncompressed data. The uncompressed data is then stored in a frame buffer for subsequent display.

23 Claims, 3 Drawing Sheets

METHOD AND APPARATUS FOR DECOMPRESSING COMPRESSED DATA

TECHNICAL FIELD OF THE INVENTION

This invention relates generally to data compression and more particularly to data decompression.

BACKGROUND OF THE INVENTION

Processing of video data is known to include receiving a stream of video data and rendering it such that it may be presented on a display device. The video stream includes a plurality of video frames and/or fields. Typically, video frames are generated for display on a progressive display devices, such as CRT monitors, High Definition Televisions, and/or LCD panels, while video fields are typically displayed on interlaced devices such as television sets. For each video framie, or video field, the video data includes information regarding the object-elements (e.g., triangles) that make up the image(s) being rendered. For example, the information may be vertex data of the triangles that includes physical coordinates, texture coordinates, color information/or alpha-blending information and/or other information needed to render the triangles.

In a computer system, a video graphics processor is operably coupled to receive an uncompressed stream of video data from a central processing unit and/or a video input device, such as a television decoder. Upon receiving the strewn of video data, the video graphics processor produces pixel data therefrom and provides the pixel data to the display device. The video graphics processor produces the pixel data by interpreting the object-element parameters, generating pixel data for each pixel of an object-element, and storing the pixel data in a frame buffer until a full frame of data is stored. Such processing is usually done in accordance with the refresh rate of the display, which is typically 50 hertz, 60 hertz, 75 hertz, 90 hertz, etc.

A video graphics processor may also process compressed video data that has been compressed in accordance with the Motion Picture Expert Group (MPEG) 2 standard. In general, the MPEG 2 standard compresses a video frame by encoding the difference between a current video frame and reference video frames. As is known, MPEG 2 provides three types of video frames, an I frame, a P frame, and a B frame. The I frame is an independent frame and is compressed independent of other frames. The P frame is compressed based on differences between it and a reference I frame. The B frame is compressed based on the differences between it, a reference P frame and a reference I frame.

The MPEG 2 standard also prescribes an architecture for an MPEG 2 video decoder. Such a decoder includes a variable length decoding section, inverse scan section, inverse quantization, inverse discrete cosine transform section, motion compensation section, and memory. The implementation of the architecture prescribed by the MPEG 2 standard is costly, in part, due to the cost of the inverse discrete cosine transform function. Such a function typically requires several separate memory sections to properly process the inverse discrete cosine transform function. Such additional memory requires substantial die area, which increase the cost of implementing the decoder on an integrated circuit.

Decoding of MPEG 2 encoded video data typically is implemented in software, which is executed by a central processing unit of a computer, and a hardware co-processor, such as a video graphics circuit. The software portion typically includes parsing of the compressed video data into an audio component, a video component, a subpicture component, and an auxiliary component. The video component is provided to a software variable length decoder, which produces motion vectors and run/level data. The run/level data is provided to a dequanitizing software module and the dequantized data is provided to system memory. The video graphics circuitry retrieves the motion vectors and the run/level data from system memory and performs a run-level decode, dequantization, de-zigzagging of the coefficients, and an inverse discrete cosine transform function. Once the error terms have been recaptured, the video graphics circuit utilizes the motion vectors and the error terms to recapture the uncompressed video data.

In such an embodiment, the software portion of the video decoding process is very much dependent on the hardware portion of the decoding module. As such, the software portion executes a certain number of instructions then waits for the hardware co-processor to execute its related functions. While the hardware portion is executing its functions, the software portion is waiting. The alternate performance of the respective functions between the software and the hardware continues until all of the video has been processed. As such, the hardware waits for the software to perform its function and then the software waits while the hardware is performing its function. When the software is waiting, it directly corresponds to the central processing unit waiting. While the central processing unit may perform other functions while waiting for the video graphics hardware, it still must monitor the hardware to know when the next software function is to be performed.

Therefore, a need exists for a method and apparatus for data decompression that improves concurrency between software portions and hardware portions of the data decompression process and reduces the memory required for such processing.

DETAILED DESCRIPTION OF THE DRAWINGS

Generally, the present invention provides a method and apparatus for decompressing compressed data, which includes video data that has been compressed in accordance with the MPEG 2 standard. Such a process begins by retrieving components from a non-local memory at a rate that is independent of the rate in which the components were written into the non-local memory. The components include motion vectors and run/level data. As the components are retrieved from memory, the run/level data is used to produce representations of the uncompressed data. For example, if the compressed data is representative of MPEG 2 video data, the representation of uncompressed data would equate to error terms of a frame of video data (B or P frame) and/or the frame of video data (I frame). As the representations of the uncompressed data are generated, they are processed based on the motion vector data to recapture the uncompressed data. The uncompressed data is then stored in a frame buffer for subsequent display. With such a method and apparatus, a data decompression circuit may be generated that has greater concurrency between its software functionality and hardware functionality and further reduces memory requirements to decompress the data.

Figure 1:
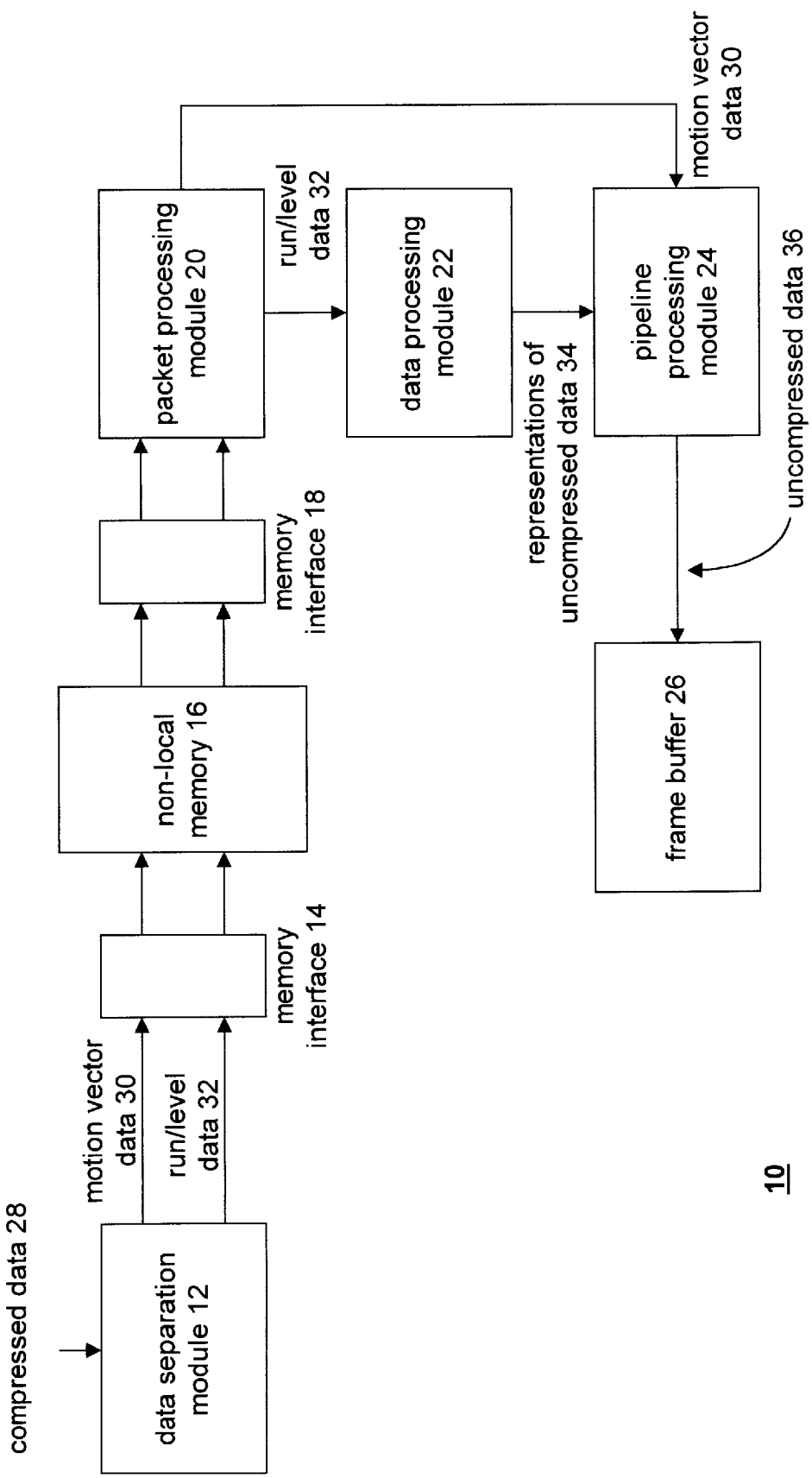
FIG. 1 illustrates a schematic block diagram of a data decompression circuit in accordance with the present invention.

The present invention can be more fully described with reference to FIGS. 1 through 4. FIG. 1 illustrates a data decompression circuit 10 that includes a data separation module 12, a memory interface 14, non-local memory 16, a second memory interface 18, a packet processing module 20, a data processing module 22, a pipeline processing module 24, and a frame buffer 26. The data separation module 12 is operably coupled to receive compressed data 28 and to produce motion vector data 30 and run/level data 32. Such components (e.g., the motion vector data and the run/level data 32) are stored in the non-local memory 16 via the memory interface 14. The data separation module 12 stores the components in the non-local memory at a rate that is independent of the rate in which the data is retrieved from the non-local memory. As such, the data separation module 12, which is typically software that is executed by the central processing unit, can perform its portion of the data decompression process substantially independently of the hardware portion performing its portion of the data decompression process. The details of the data separation module 12 will be discussed in greater detail with reference to FIG. 2.

The packet processing module 20 is operably coupled to retrieve the motion vector data 30 and the run/level data 32 from the non-local memory 16 via the memory interface 18. The retrieval of the components is done at a rate independent of the rate in which they were written into the non-local memory 16. The packet processing module 20 then provides the run/level data 32 to the data processing module 22 and the motion vector data to the pipeline processing module 24. The packet processing module 20 provides the data in a pipelined and synchronized fashion such that uncompressed data 36 is obtained.

The data processing module 22, upon receiving the run/level data 32 generates a plurality of coefficients that are stored in a coefficient section of local memory (not shown, but is included within the video graphics circuit). The coefficients are then converted to intermediate results by performing a one-dimensional inverse discrete cosine transform function. The intermediate results are stored in an intermediate results section of the local memory and subsequently retrieved and processed by another one-dimensional inverse discrete cosine transform function to produce the representations of the uncompressed data 34. The representations of the uncompressed data 34 are stored in an output buffer section of memory and retrieved by the pipeline process module 24 along with the motion vector data 30.

The pipeline processing module 24, upon receiving the representations of uncompressed data 34 and the motion vector data 30 produces the uncompressed data 36. The uncompressed data is subsequently stored in a frame buffer 26. The details of modules 12, 20, 22 and 24 will be discussed in greater detail with reference to FIG. 2.

Figure 2:
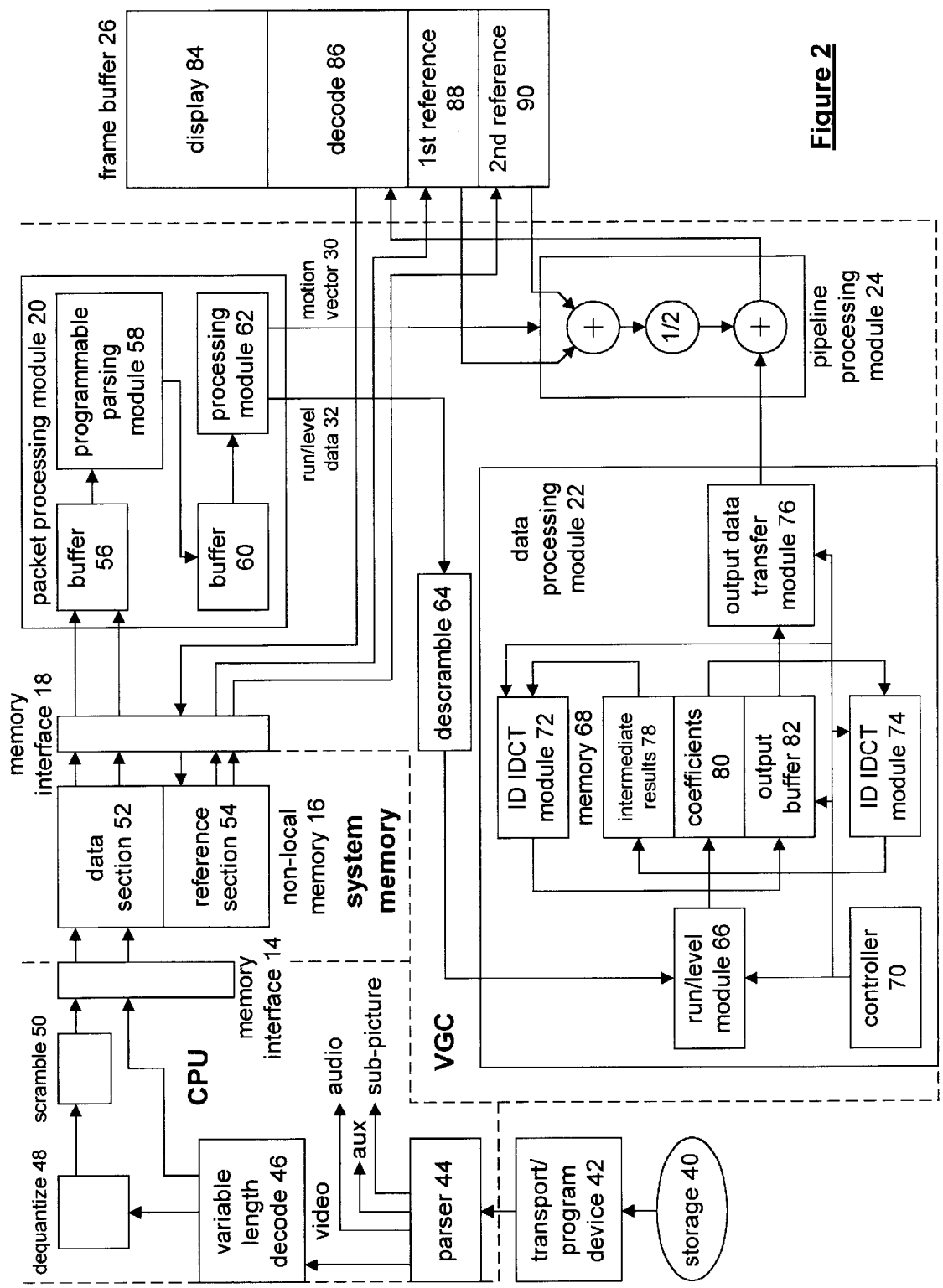
FIG. 2 illustrates a more detailed schematic block diagram of the data decompression circuit of FIG. 1.

FIG. 2 illustrates a more detailed schematic block diagram of the data decompression circuit 10 of FIG. 1. The data decompression circuit is shown to be divided into four sections, the first section relates to software which is performed by the central processing unit, the second section is system memory, the third section is the video graphics circuitry (VGC), and the fourth section is the frame buffer section. The software portion, which is executed by the central processing unit, includes a parser module 44, a variable length decoder 46, a dequantize module 48, and an optional scramble module 50. The parser module 44 is operably coupled to receive compressed video inputs from a transport/program device 42, such as a VCR, DVD, television tuner, cable set top box, satellite dish receiver, etc. In addition, the parsing module 44 may receive the compressed video data from a storage device 40 such as a hard drive, database, external memory, etc. Note that the transport/program device 42 may include a descramble function.

Upon receiving the compressed video data, the parsing module separates the compressed video data into a video component, an audio component, a subpicture component, and an auxiliary component in accordance with the MPEG 2 decoding standard. The video portion is provided to the variable length decoder 46, which produces the run/level data 32 and the motion vector data 30. The run/level data 32 is provided to the dequantized module 48 for subsequent dequantization. The dequantized run/level data may then optionally be scrambled by scramble module 50 and stored in the data section 52 of the non-local memory 16. The motion vector data 30 is provided from the variable length decoder 46 to the data section 52 of the non-local memory 16.

The packet processing module 20 includes a first buffer 56, a programmable parsing module 58, a second buffer 60, and a processing module 62. The first buffer, buffer 56 is operably coupled to retrieve selected data elements of a data block of the compressed data from the non-local memory 16 in concurrence with writing of the compressed data into the non-local memory. As such, as the run length data and motion vector data are written into the data section 52, the first buffer may retrieve them at a rate which is independent of the rate in which they are written such that greater concurrency between the software and hardware portions of the data decompression circuit are obtained.

The programmable parsing module 58 retrieves the selected data elements from the first buffer and interprets them to ascertain their particular data format. If the data format is inconsistent with the data format of the packet processing module and/or the data format of the data processing module 22, the programmable parsing module converts the selected data elements to a data format that is consistent with the packet processing module and/or the data processing module 22. The second buffer 60 is operably coupled to store the converted data elements and/or the non-converted data elements provided by the programmable parsing module 58. The processing module 62 retrieves the properly formatted data elements from the second buffer and provides the run/level data 32 to the descramble module 64 and the motion vector data 30 to the pipeline processing module For a more detailed discussion of the packet processing module refer to co-pending patent application entitled "METHOD AND APPARATUS FOR CO-PROCESSING MULTI-FORMATTED DATA", having a Ser. No. of 09/047,193, a filings date of Mar. 24, 1998, and is assigned to the same assignee as the present patent application.

The descramble module 64, upon receiving the run/level data 32, descrambles it to recapture the run level data 32. Note that the scramble process and the descramble process may be a simple encoding and decoding process such as adding an offset value, or utilizing a simple scramble technique, or may be a sophisticated encryption program.

The data processing module 22 includes a run/level module 66, memory 68, a first one-dimensional inverse discrete cosine transform module 72, a second one-dimensional inverse discrete cosine transfer module 74, a controller 70, and an output data transfer module 76. The run/level module 66 is operably coupled to receive the run/level data 30 and to produce therefrom a plurality of coefficients, which are stored in the a coefficient section 80 of memory 68. Typically, the run/level data includes two-dimensional frequency components that correspond to the compressed video data. The second one-dimensional inverse discrete cosine transfer module 74 retrieves the coefficients from the memory 68 and processes them to produce intermediate results. The intermediate results are stored in the intermediate results section 78 of memory 68. The intermediate results are then retrieved by a second one-dimensional inverse discrete cosine transform module 72 to produce the representations of uncompressed data. The representations of uncompressed data are stored in the output buffer section 82. The output data transfer module 76 retrieves the representations of the uncompressed data in a sequenced manner and provides them to the pipeline processing module 24. The controller 70 controls access to memory 68 in a time division multiplex manner.

For a more detailed discussion of the data processing module, refer to co-pending patent application entitled "METHOD AND APPARATUS FOR DECODING COMPRESSED VIDEO", having a Ser. No. of 09/083,405, a filing date of May 22, 1998, and is assigned to the same assignee as the present invention.

The pipeline processing module 24 includes a pair of adders and a dividing circuit. The pipeline processing module 24 further includes logic circuitry to produce the uncompressed data. Such logic circuitry is not shown. The first adder of the pipeline processing module retrieves data from a first and second reference section of the frame buffer 26. The result is then divided by two and summed with the representations of the uncompressed data (e.g., error terms and/or compressed data). The output of the pipeline processing module 24 is provided to the decode section 86 of the frame buffer 26. The pipeline processing module 24 performs a typical MPEG 2 pipeline decoding process.

The frame buffer 26 includes a display section 84, a decode section 86, a first reference section 88, and a second reference section 90. Note that the first and second reference sections contain significantly less entries than the decode section or the display section. Typically, the display section and decode section of the frame buffer 26 will include sufficient data entries to store a full-frame of data. The first and second reference sections 88 and 90, however, will include enough data entries to store a fractional portion of a full-frame of video. Such fractional portion may be in the range of 20–50% of a frame of data.

As shown, the non-local memory 16 includes a reference section 54, which stores the first and second reference frame of data. The reference frames are retrieved via the memory interface 18 and provided to the first and second reference sections 88 and 90. These portions of the reference frames are utilized by the pipeline processing module to recapture a current frame of video data.

For a more detailed discussion of the frame buffer 26 and the utilization of the first and second reference sections 88 and 90 refer to a co-pending patent application entitled "METHOD AND APPARATUS FOR DECODING A STREAM OF DATA BLOCKS," having a Ser. No. of 09/064,803, and a filing date of Apr. 22, 1998, assigned to the same assignee as the present invention and a co-pending patent application entitled "METHOD AND APPARATUS FOR ENCODING A STREAM OF DATA BLOCKS," having a Ser. No. of 09/064,700, and a filing date of Apr. 22, 1998, assigned to the same assignee as the present invention.

By incorporating the packet processing module 20, the software portion and the hardware portion of the data decompression process can operate at independent rates. As such, greater concurrency between the software portion and hardware portion is obtained. As such, the central processing unit is spending considerably less time in wait cycles for the hardware portion to perform its function and/or less time monitoring the hardware portion. In addition, by including the data processing module 22, significant memory reductions can be obtained by utilizing memory 68 and the controller 70. Further memory savings may be obtained by utilizing the frame buffer configuration as shown.

Figure 3:
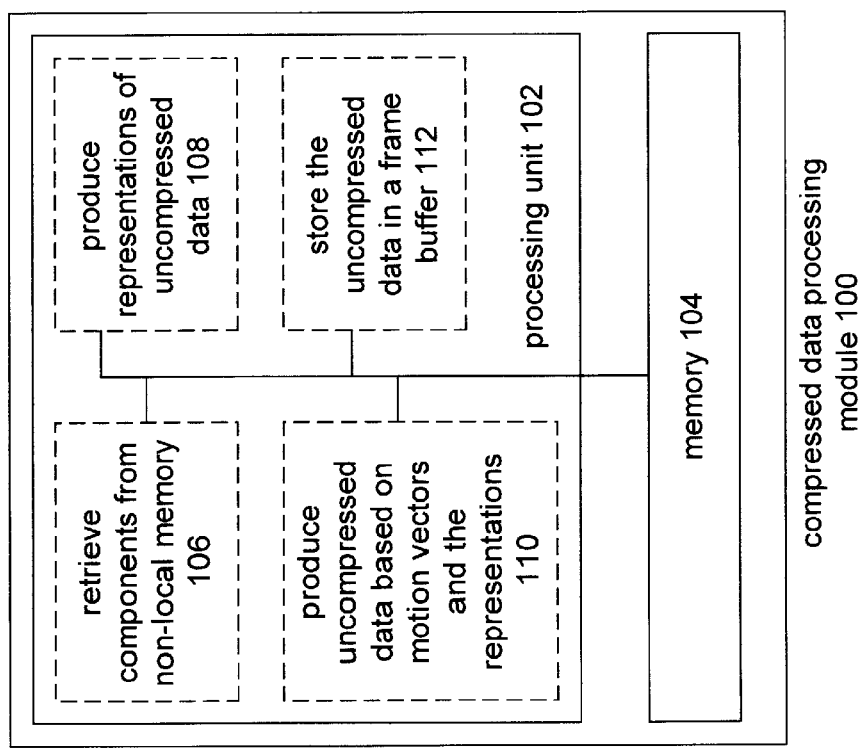
FIG. 3 illustrates a schematic block diagram of a compressed data processing module.

FIG. 3 illustrates a schematic block diagram of a compressed data processing module 100. The compressed data processing module 100 includes a processing unit 102 and memory 104. The processing unit 102 may be a microprocessor, microcontroller, digital signal processor, co-processor, host processor, central processing unit, and/or any other device that manipulates digital information based on programming instructions. The memory 104 may be read-only memory, random access memory, reprogrammable memory, hard disk memory, magnetic tape memory, floppy disk memory, and/or any other device that stores digital information.

The memory 104 stores programming instructions that, when read by the processing unit, cause the processing unit to function as a plurality of circuits 108–112. While reading the programming instructions, the processing unit 102 functions as circuit 106 to retrieve components from non-local memory. The processing unit then functions as circuit 108 to produce representations of uncompressed data based on the components. The processing unit then functions as circuit 110 to produce uncompressed data based on motion vectors and the representations of uncompressed data. The processing unit then functions as circuit 112 to store the uncompressed data in a frame buffer. The programming instructions stored in memory 104 and the execution thereof by the processing unit 102 will be discussed in greater detail with reference to FIG. 4.

Figure 4:
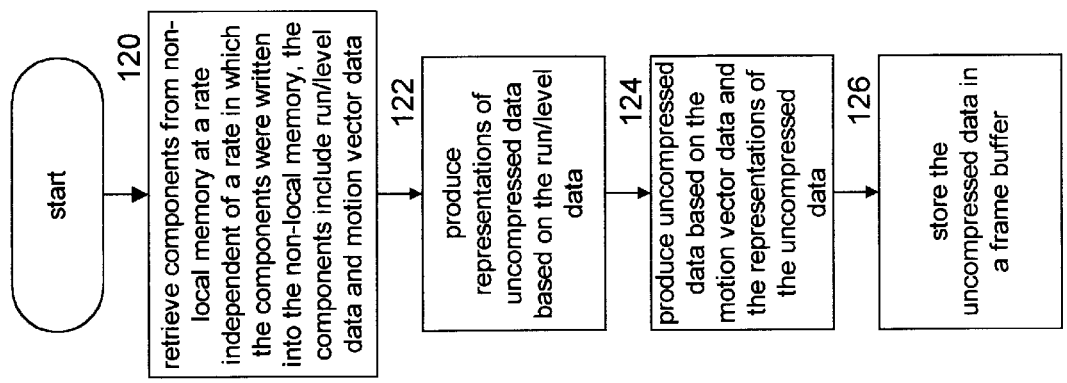
FIG. 4 illustrates a logic diagram of a method for decompressing data.

FIG. 4 illustrates a logic diagram of a method for data decompression. The process begins at step 120 where components are retrieved from non-local memory at a rate independent of a rate in which the components are written into the non-local memory. The components include run/level data and motion vector data of the compressed data. Note that prior to storing the components (or at least the run/level data) in the non-local memory, the components may be encoded by a scrambling process. If so, after the retrieval, the components need to be decoded to recapture the original unencoded components. To achieve the independent retrieval of the components, the selected data element, or components, of a data block of the compressed data are interpreted as they are retrieved from the memory. The interpretation determines whether the components are in a data format consistent with a data format to produce the representations of the uncompressed data. If the format is inconsistent, the format will be converted to be in accordance with the data format for producing the representations of uncompressed data.

The process then proceeds to step 122 where representations of uncompressed data are produced based on the run/level data of the components. The representations of uncompressed data may be generated by producing a plurality of coefficients based on the run/level data. The run/level data includes two-dimensional frequency components that correspond to the compressed data. As the coefficients are generated, they are stored in a coefficient section of local memory. The coefficients are then used to produce intermediate results using a one-dimensional inverse discrete cosine transform function. The intermediate results are then stored in an intermediate result section of the local memory. The intermediate results are then retrieved in a transposed manner from memory and utilized to produce the representations of the uncompressed data using a second one-dimensional inverse discrete cosine transform function. The representations of the uncompressed data are stored in an output buffer section of the local memory and subsequently retrieved, and provided, in a sequenced manner, to the pipeline processing module. Note that the access to the memory is controlled in a time multiplex manner.

The process then proceeds to step 124 where uncompressed data is produced based on the motion vector data and the representations of the uncompressed data. Note that the uncompressed data may further be produced based on previously produced uncompressed data. The previously produced uncompressed data may be stored in the non-local memory and retrieved as referenced frames, where the retrieval is done in portions. The portions, as they are retrieved, are stored in a reference section of the frame buffer and utilized to produce the uncompressed data which is stored in a decode section of the frame buffer.

The process then proceeds to step 126 where the uncompressed data is stored in a frame buffer. The uncompressed data is then subsequently retrieved by a display driver and provided to a display device.

The preceding discussion has presented a method and apparatus for data decompression. Such a method and apparatus improves the concurrency between the software and hardware portions of the data decompression process as well as reducing memory requirements. As one of average skill in the art would appreciate, the teachings of the present invention may be utilized to produce other embodiments of the invention that are equivalent to the embodiments disclosed and are within the spirit of the teachings of the present invention.

What is claimed is:

1. A data decompression module comprises:
   a data separation module operably coupled to receive compressed data and to separate components of the compressed data, wherein the components include motion vector data and run/level data;
   first memory interface operably coupled to the data separation module, wherein the components are provided to non-local memory via the memory interface;
   second memory interface operably coupled to receive the components from the non-local memory;
   packet processing module operably coupled to the second memory interface, wherein the packet processing module retrieves the components from the non-local memory at a rate independent of a rate in which the components were written into the non-local memory;
   data processing module operably coupled to the packet processing module, wherein the data processing module receives the retrieved components from the packet processing module and produces therefrom representations of uncompressed data;
   pipeline processing module operably coupled to receive the motion vector data and the representations of the uncompressed data and to produce therefrom the uncompressed data; and
   frame buffer operably coupled to store the uncompressed data.

2. The data decompression module of claim 1 further comprises:
   a scramble module operably coupled to receive the components from the separation module and to encode the components to produce encoded components; and
   a descramble module operably coupled to receive the encoded components from the second memory interface and to decode the encoded components to recapture the components.

3. The data decompression module of claim 1, wherein the frame buffer comprises a display section, a decode section, a first reference section, and a second reference section.

4. The data decompression module of claim 3, wherein the first and second reference sections include substantially less data storage capacity than the display section or the decode section, wherein first reference data and second reference data are stored in the non-local memory, wherein portions of the first reference data are provided from the non-local memory to the first reference section, and wherein portions of the second reference data are provided from the non-local memory to the second reference section.

5. The data decompression module of claim 1, wherein the data processing module further comprises:
   a run/level module operably coupled to receive the run/level data and produces therefrom a plurality of coefficients, wherein the run/level data includes two dimensional frequency components that correspond to the compressed data;
   memory that includes a coefficient section, an intermediate result section, and an output buffer section, wherein the coefficient section stores the plurality of coefficients;
   a first one-dimensional inverse discrete cosine transform module operably coupled to receive the plurality of coefficients and to produce therefrom intermediate results of one of the two-dimensional frequency components of the compressed data, wherein the intermediate results are stored in the intermediate result section;
   a second one-dimensional inverse discrete cosine transform module operably coupled to retrieve the intermediate results from the intermediate result section and to produce therefrom the representations of uncompressed data, wherein the representations of uncompressed data are stored in the output buffer section;
   output data transfer module operably coupled to retrieve the representations of the uncompressed data and to provide, in a sequenced manner, the representations of the uncompressed data to the pipeline processing module; and
   a controller operably coupled to the run/level module, the memory, the output data transfer module, and the first and second one dimensional inverse discrete cosine transform modules, wherein the controller controls, in a time multiplex manner, access to the memory.

6. The data decompression module of claim 1, wherein the packet processing module further comprises:
   a first buffer operably coupled to retrieve selected data elements of a data block of the compressed data from the non-local memory in concurrence with writing of the compressed data into the non-local memory;
   a programmable parsing module operably coupled to the first buffer, wherein the programmable parsing module interprets the selected data elements and converts the data format of the selected data elements to produce converted data elements when the data format is inconsistent with a data format of the packet processing module;

a second buffer operably coupled to store the converted data elements; and a processing module operably coupled to process the converted data elements.

7. The data decompression module of claim 1, wherein the data separation module further comprises a parsing module that parses the compressed data into a video component, an audio component, an auxiliary component, and a sub-picture component when the compressed data is compressed video data.

8. A compressed data processing module comprises:

memory interface operably coupled to receive components of the compressed data from a non-local memory;

packet processing module operably coupled to the memory interface, wherein the packet processing module retrieves the components from the non-local memory via the memory interface at a rate independent of a rate in which the components were written into the non-local memory;

data processing module operably coupled to the packet processing module, wherein the data processing module receives the retrieved components from the packet processing module and produces therefrom representations of uncompressed data;

pipeline processing module operably coupled to receive motion vector data and the representations of the uncompressed data and to produce therefrom the uncompressed data, wherein the motion vector data is one of the components; and frame buffer operably coupled to store the uncompressed data.

9. The compressed data processing module of claim 8 further comprises:

a descramble module operably coupled to receive encoded components via the memory interface and to decode the encoded components to recapture the components.

10. The compressed data processing module of claim 8, wherein the frame buffer comprises a display section, a decode section, a first reference section, and a second reference section.

11. The compressed data processing module of claim 10, wherein the first and second reference sections include substantially less data storage capacity than the display section or the decode section, wherein first reference data and second reference data are stored in the non-local memory, wherein portions of the first reference data are provided from the non-local memory to the first reference section, and wherein portions of the second reference data are provided from the non-local memory to the second reference section.

12. The compressed data processing module of claim 8, wherein the data processing module further comprises:

a run/level module operably coupled to receive the run/level data and produces therefrom a plurality of coefficients, wherein the run/level data includes two dimensional frequency components that correspond to the compressed data;

memory that includes a coefficient section, an intermediate result section, and an output buffer section, wherein the coefficient section stores the plurality of coefficients;

a first one-dimensional inverse discrete cosine transform module operably coupled to receive the plurality of coefficients and to produce therefrom intermediate results of one of the two-dimensional frequency components of the compressed data, wherein the intermediate results are stored in the intermediate result section;

a second one-dimensional inverse discrete cosine transform module operably coupled to retrieve the intermediate results from the intermediate result section and to produce therefrom the representations of uncompressed data, wherein the representations of uncompressed data are stored in the output buffer section;

output data transfer module operably coupled to retrieve the representations of the uncompressed data and to provide, in a sequenced manner, the representations of the uncompressed data to the pipeline processing module; and a controller operably coupled to the run/level module, the memory, the output data transfer module, and the first and second one dimensional inverse discrete cosine transform modules, wherein the controller controls, in a time multiplex manner, access to the memory.

13. The compressed data processing module of claim 8, wherein the packet processing module further comprises:

a first buffer operably coupled to retrieve selected data elements of a data block of the compressed data from the non-local memory in concurrence with writing of the compressed data into the non-local memory;

a programmable parsing module operably coupled to the first buffer, wherein the programmable parsing module interprets the selected data elements and converts the data format of the selected data elements to produce converted data elements when the data format is inconsistent with a data format of the packet processing module;

a second buffer operably coupled to store the converted data elements; and a processing module operably coupled to process the converted data elements.

14. A method for decompressing data, the method comprises the steps of:

a) retrieving components from a non-local memory at a rate independent of a rate in which the components were written into the non-local memory, wherein the components include motion vector data and run/level data;

b) producing representations of uncompressed data based on the run/level data;

c) producing uncompressed data based on the motion vector data and the representations of the uncompressed data using a pipeline process; and d) storing the uncompressed data in a frame buffer.

15. The method of claim 14, wherein step (a) further comprises:

retrieving encoded components from the non-local memory; and decoding the encoded components to recapture the components.

16. The method of claim 14, wherein step (c) further comprises producing the uncompressed data based on previously produced uncompressed data, wherein the previously produced uncompressed data is stored in non-local memory and retrieved in portions, wherein the portions of the previously produced uncompressed data is stored in a reference section of the frame buffer, and wherein a decode section of the frame buffer is utilized to produce the uncompressed data.

17. The method of claim 14, wherein step (b) further comprises:

producing a plurality of coefficients based on the run/level data, wherein the run/level data includes two dimensional frequency components that correspond to the compressed data;

storing the plurality of coefficients in a coefficient section of local memory;

producing intermediate results based on the plurality of coefficients using a one-dimensional inverse discrete cosine transform, storing the intermediate results in an intermediate result section of the local memory;

producing the representations of the uncompressed data using a second one-dimensional inverse discrete cosine transform;

storing the representations of uncompressed data in an output buffer section of the local memory; and providing the representation of the uncompressed data in a sequence manner from the output buffer section for the producing of the uncompressed data, wherein access to the local memory is controlled in a time multiplex manner.

18. The method of claim 14, wherein step (a) further comprises:

retrieving selected data elements of a data block of the compressed data from the non-local memory in concurrence with writing of the compressed data into the non-local memory;

interpreting the selected data elements;

converting data format of the selected data elements to produce converted data elements when the data format is inconsistent with a data format for producing the representations of the uncompressed data;

storing the converted data elements; and processing the converted data elements such that the representations of the uncompressed data are produced.

19. A compressed data processing module comprises:

a processing module; and memory operably coupled to the processing module, wherein the memory stores programming instructions that, when read by the processing module, cause the processing module to (a) retrieve components from a non-local memory at a rate independent of a rate in which the components were written into the non-local memory, wherein the components include motion vector data and run/level data; (b) produce representations of uncompressed data based on the run/level data; (c) produce uncompressed data based on the motion vector data and the representations of the uncompressed data using a pipeline process; and (d) store the uncompressed data in a frame buffer.

20. The compressed data processing module of claim 19, wherein the memory further comprises programming instructions that cause the processing module to:

retrieve encoded components from the non-local memory; and decode the encoded components to recapture the components.

21. The compressed data processing module of claim 19, wherein the memory further comprises programming instructions that cause the processing module to produce the uncompressed data based on previously produced uncompressed data, wherein the previously produced uncompressed data is stored in non-local memory and retrieved in portions, wherein the portions of the previously produced uncompressed data is stored in a reference section of the frame buffer, and wherein a decode section of the frame buffer is utilized to produce the uncompressed data.

22. The compressed data processing module of claim 19, wherein the memory further comprises programming instructions that cause the processing module to:

produce a plurality of coefficients based on the run/level data, wherein the run/level data includes two dimensional frequency components that correspond to the compressed data;

store the plurality of coefficients in a coefficient section of local memory;

produce intermediate results based on the plurality of coefficients using a one-dimensional inverse discrete cosine transform, store the intermediate results in an intermediate result section of the local memory;

produce the representations of the uncompressed data using a second one-dimensional inverse discrete cosine transform;

store the representations of uncompressed data in an output buffer section of the local memory; and provide the representation of the uncompressed data in a sequence manner from the output buffer section for the producing of the uncompressed data, wherein access to the local memory is controlled in a time multiplex manner.

23. The compressed data processing module of claim 19, wherein the memory further comprises programming instructions that cause the processing module to:

retrieve selected data elements of a data block of the compressed data from the non-local memory in concurrence with writing of the compressed data into the non-local memory;

interpret the selected data elements;

convert data format of the selected data elements to produce converted data elements when the data format for producing the representations of the uncompressed data;

store the converted data elements; and process the converted data elements such that the presentations of the uncompressed data are produced.

* * * * *